United States Patent
Zubris

[11] 3,809,978
[45] May 7, 1974

[54] CIRCUIT FOR ELECTRICALLY-OPERATED VEHICLE

[76] Inventor: Joseph R. Zubris, 5 Glover Pl., Dorchester, Mass.

[22] Filed: Sept. 8, 1972

[21] Appl. No.: 287,563

[52] U.S. Cl. .............................................. 318/139
[51] Int. Cl. ........................................... H02p 7/06
[58] Field of Search ........... 318/139, 247, 248, 252; 320/7

[56] References Cited
UNITED STATES PATENTS

| | | | |
|---|---|---|---|
| 3,264,540 | 8/1966 | Dannettell | 318/139 |
| 1,291,233 | 1/1919 | Storer | 318/248 X |
| 3,718,848 | 2/1973 | Hines | 318/139 X |
| 3,207,966 | 9/1965 | Parkinson | 318/139 |
| 3,702,959 | 11/1972 | Le Gloan | 318/139 |

*Primary Examiner*—Bernard A. Gilheany
*Assistant Examiner*—W. E. Duncanson, Jr.

[57] ABSTRACT

A DC motor circuit powered by two banks of automobile storage batteries includes an armature, a pair of field windings which are essentially connected in parallel with each other and in series with the armature of the motor, an excitation circuit coupled to the pair of field windings for establishing a potential thereacross and having its own DC power source, a switch for operating the DC motor in either the forward or reverse direction and circuit means including a full wave rectifier bridge for recharging the two banks of batteries. The circuit may also include means for switching from a parallel connection of the banks of storage batteries wherein maximum current is available for starting and low speed operation, to a series connection for full voltage high speed operation. With the circuit of this invention greater efficiency of the motor is obtained primarily by means of the field excitation circuit, and where limited operating range is acceptable the circuitry enables a vehicle to be powered by readily available automotive batteries and still have exceptionally good performance.

16 Claims, 1 Drawing Figure

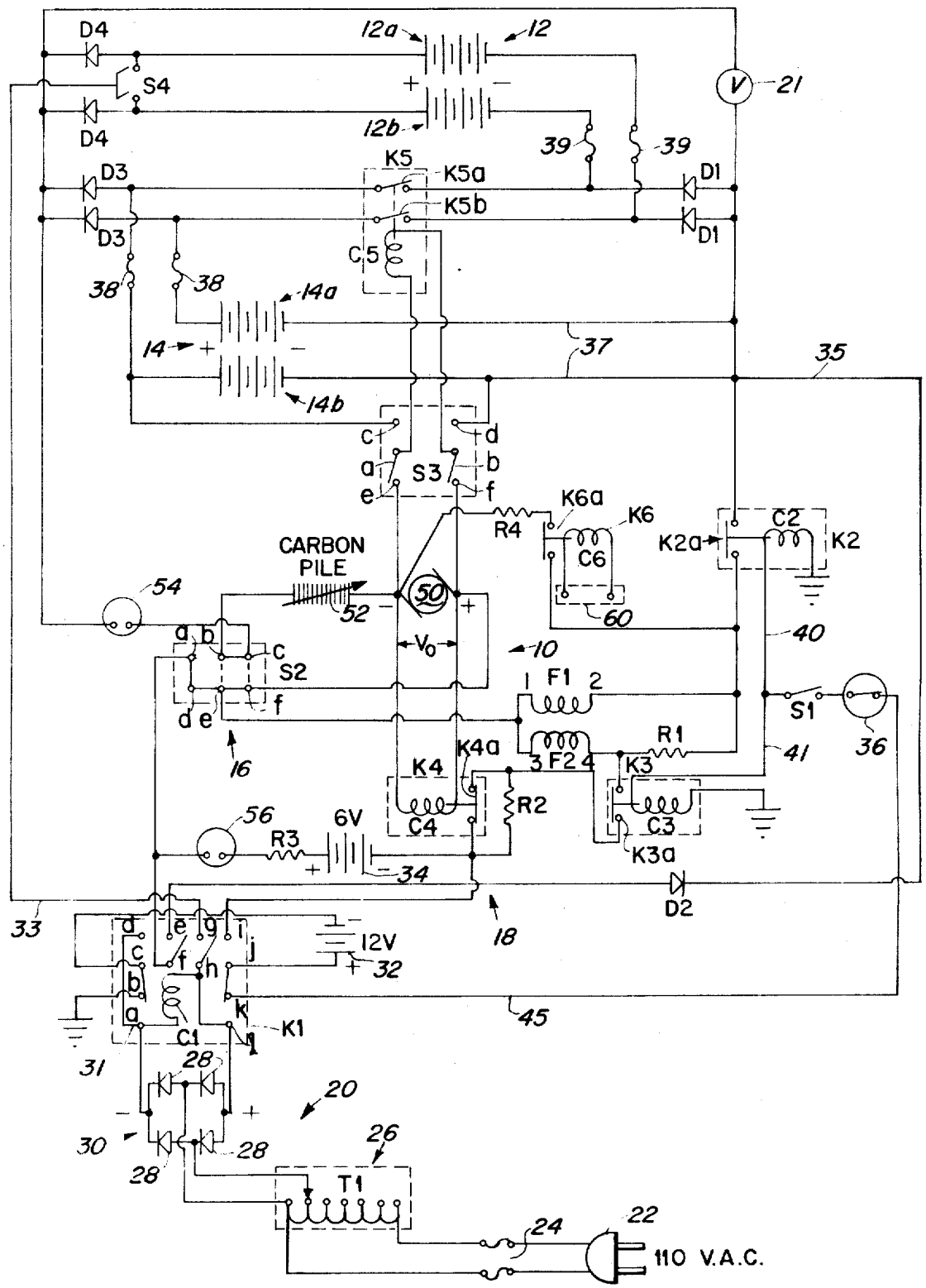

CIRCUIT FOR ELECTRICALLY-OPERATED VEHICLE

BACKGROUND OF THE INVENTION

The present invention relates in general to a circuit for an electrically operated vehicle. More particularly, the present invention is concerned with an improved direct current motor circuit that has been designed to operate efficiently and with less power drain from the storage batteries than with existing circuits used for powering vehicles.

Power circuits for electrical vehicles generally require a relatively large electric motor for powering the vehicle, and this motor in turn requires an excessive number of storage batteries for properly powering the motor over a reasonable period of operation. These known circuits generally do not provide for efficiently operating the motor with the least amount of drainage from the storage batteries. In particular, known circuits require excess surge currents during starting and low speed operations. In addition, these electrical vehicles have either been overly complex and too costly to be manufactured for general public usage, or alternatively, are too small and limited in the period of use obtained between battery charging.

Accordingly, it is an object of the present invention to provide an improved electrically-operated vehicle circuit that is efficient in operation and can be operated over longer periods than known circuits having the same storage battery capacity.

Another object of the present invention is to provide a battery operated vehicle circuit that does not require an excessive number of storage batteries for its operation.

Still another object of the present invention is to provide an electrically-operated vehicle circuit that has improved starting efficiency and operating efficiency by minimizing surge currents thereby enabling the vehicle to operate over longer periods than known circuits having the same storage battery capacity.

Another object of the present invention is to provide a battery-operated vehicle characterized by enhanced torque thereby allowing the use of a generally smaller motor to provide improved vehicle performance at lower battery drain.

A further object of the present invention is to provide a battery-powered vehicle circuit comprising a motor, including an armature and field windings and an excitation circuit for enabling more efficient operation of the motor and further enabling the use of a smaller horsepower motor than has been possible with existing systems operating on a like storage battery capacity.

Still a further object of the present invention is to provide an electrically operated vehicle that can be manufactured relatively inexpensively, whose circuitry is not excessively complex, which is able to operate over a relatively long time period without requiring recharging of the batteries, and which can operate at a reasonably high top speed.

Another object of the present invention is to provide a battery operated circuit that is relatively easily adaptable to existing vehicles such as gasoline driven vehicles.

SUMMARY OF THE INVENTION

To accomplish the foregoing and other objects of the present invention, the circuit of the present invention generally comprises a direct current motor including an armature and a pair of field windings which are coupled in parallel with each other and in series with the armature. This circuit also includes preferably two banks of storage batteries for powering the motor, means for selectively connecting the storage batteries to the motor when the vehicle is to be operated, means for permitting either forward or reverse operation of the motor and the vehicle, means for recharging the storage batteries when the vehicle is not in use, and an excitation circuit coupled to the pair of field windings for establishing a magnetic field therein. This excitation circuit includes its own storage battery which is primarily responsible for establishing this magnetic field in the field windings. By establishing this field the initial surge currents to the armature are reduced and the armature is allowed to develop a full torque at a lower current input which in turn requires less of a drain on the batteries per mile of operation.

In accordance with another aspect of the present invention, there is provided a three-position switch which can be set to either the high speed, normal speed or automatic mode of operation. In the normal mode of operation, the two battery banks are connected in parallel whereas in the high speed mode of operation the two banks of batteries are switched to a series connection. The high and normal modes of operation are selected manually. In the automatic mode, the batteries are connected in parallel until a predetermined armature voltage is developed across the armature at which time the batteries automatically switch to a series connection thereby providing additional voltage to the motor circuit for higher speed operation.

In the present invention the use of a field excitation circuit is of particular importance, as the use of this circuit primarily enables one to operate at lower surge currents. In one embodiment the starting and acceleration power drain were reduced by approximately 50 percent. The normal running power drain is also reduced by the use of the excitation circuit. However, it is noted that even if the excitation circuit should malfunction vehicle operation does continue, at a degraded efficiency.

BRIEF DESCRIPTION OF THE DRAWING

Numerous other objects features and advantages of the invention will now become apparent upon a reading of the following detailed description taken in conjunction with the accompanying drawing of a circuit schematic diagram of a preferred embodiment of a circuit for use in an electrically-operated vehicle and constructed in accordance with the principles of the present invention.

DETAILED DESCRIPTION

Referring now to the sole drawing in the application, there is shown a circuit schematic diagram of a preferred embodiment of a motor drive circuit for driving a vehicle. The circuit generally comprises a motor 10, battery banks 12 and 14, reversing switch 16, excitation circuit 18 and charging circuit 20.

When it is desired to recharge all of the storage batteries included in the circuit the plug 22 is coupled to a conventional 110 VAC line. The plug 22 connects by way of fuse 24 to auto-transformer 26 of the charging circuit 20. The autotransformer is of conventional design and includes a plurality of different taps. By adjusting the setting of these taps different voltages can be coupled to the full wave bridge 30 which is also of conventional design and includes a plurality of diodes 28.

It is advantageous to use an auto-transformer 26 in the circuit of this invention in order to provide for different degrees of charging. By feeding a relatively low voltage to the bridge circuit 30 an equalizing charge may be provided to the batteries of the circuit for stabilizing the charge on the batteries preferably over a relatively long time period. Alternatively, if it is desired to charge the batteries relatively quickly then the setting on the auto-transformer 26 is changed so that a higher AC voltage is coupled to bridge circuit 30.

The relay K1 may be referred to as an interlock relay and is used to prevent and starting of the vehicle motor while the plug 22 is inserted and the batteries are being charged. Relay K1 is shown in the sole drawing in its de-energized position wherein vehicle starting is permitted. Relay K1 includes relay coil C1 and a plurality of contacts a-1. Contacts c, f, h and j are movable contacts, the remaining contacts being fixed.

When the plug 22 is inserted in a conventional AC receptacle, the full-wave rectified voltage from bridge 30 is coupled to coil C1 by way of terminals a and 1 of relay K1. Coil C1 is thus energized and the contacts of the relay move to the opposite position to that shown in the drawing. The battery charging path thus commences at terminal K1a, couples by way of line 31 to contact K1d and from there by way of contact K1c to the negative side of battery 32 which is typically a 12-volt battery used in an automobile for powering the accessories such as the headlights. The charging path continues through battery 32 by way of contacts K1j and K1i to battery 34 of excitation circuit 18 and from thence through contacts K1e and K1f diode D2 and line 35 to the negative side of battery bank 14. The positive side of bank 12 couples by way of line 33 and switch S4 to contacts K1g and K1h and from thence to one side of coil C1 which connects to the positive output of bridge circuit 30. Relay K5 is closed during charging by keeping switch S3 in its high speed state (C5 energized).

It is noted that when relay K1 is in its energized position due to the charging voltage being applied from bridge circuit 30 that the contacts K1j and K1k are open, and thus any voltage that may be available at contact K1j is not coupled by way of line 45 to the ignition switch 36 which may be a simple on-off two-position switch, as shown.

The battery banks 12 and 14 each include, respectively, a pair of battery arrays 12a, 12b; and 14a, 14b. Each of these arrays in the disclosed embodiment includes four conventional 12 volt storage batteries and thus the voltage developed across a single array is 48 volts. Twice the current is available by connecting each of the arrays of each bank in parallel, by operation of relay K5. When the relay K5, which is discussed in more detail hereinafter, is in its open position, as shown, the banks 12 and 14 are connected in parallel. When the relay K5 is changed to its closed position, the banks 12 and 14 are then connected in series. The path of this series connection may be considered as commencing at line 35 coupling by way of lines 37 to battery bank 14, by way of fuses 38, fuses 39, and the closed contacts of relay K5 to battery bank 12. A voltmeter 21 may be coupled across the battery banks for registering the charge of the batteries and when it is low.

The diode pairs D1, D3 and D4 are used for blocking the currents between the battery banks 12 and 14 when the battery banks 12 and 14 are connected in parallel. Diode pairs D1 and D3 are effectively by-passed when relay K5 closes.

The switch S4, as shown in the drawing, is a simple double pole switch that is manually closed to connect line 33 to one side of battery bank 12 by-passing diode pair D4. This switch is moved to its closed position after the plug 22 has been inserted in order to commence the charging of the batteries.

After the battery banks 12 and 14 and the batteries 32 and 34 have been properly charged, the vehicle is then ready for use. When the ignition switch 36 is closed and the plug 22 is not inserted in the AC outlet, the relay K1 is in the position shown in the drawing and energy is coupled from the battery 32, whose negative terminal is now grounded, via ignition switch 36 to switch S1 which is a single pole/single throw switch. Switch S1 is preferably linked for operation to the accelerator pedal of the vehicle and is closed upon a slight deflection of the pedal to thereby couple energy by way of line 40 to relay coil C2 of relay K2, thereby causing its associated contact K2a to close coupling the power from battery banks 12 and 14 to the motor circuit 10. Concurrently with the energization of coil C2, coil C3 is also energized by way of line 41 thereby latching relay K3 and closing its associated contact K3a thereby coupling the excitation circuit 18 to the field windings F1 and F2 of motor 10.

The motor 10 generally comprises field windings F1 and F2 which are essentially connected in parallel and armature 50 which is essentially connected in series with windings F1 and F2 by way of reversing switch S2. Of course, the motor also has an output shaft which is suitably coupled to the drive train of the vehicle. The armature circuit of the motor also includes a carbon pile 52 which is connected in series with armature 50 for controlling the current therethrough. The carbon pile 52 is preferably attached to the same accelerator pedal that microswitch S1 is attached to and is for controlling the speed of the vehicle. The carbon pile provides smooth control upon starting and during acceleration and is designed to minimize power losses. The microswitch S1 which is open when the pedal is released, prevents waste of energy when power isn't needed, such as going down a hill or idling in traffic.

In the sole FIGURE the reversing switch 16 is shown in its forward position wherein the contacts b and c are connected together as are the contacts e and f. Contacts a and d are alternantly connected. When this manually operated switch is changed to the reverse position the contacts c and f are interconnected as are the contacts b and e thereby reversing the polarity of the voltage applied to armature 50. Meter 54 registers the current flowing in the armature circuit. The switch also has an emergency off position wherein all contacts open including, of course, a and d.

The excitation circuit 18 comprises a relay K4 with its associated coil C4 and normally closed contact K4a. Circuit 18 also includes a resistor R2, battery 34 which is preferably a 6-volt or 4-volt battery, resistor R3 and a second ammeter 56 for registering the current flowing in the excitation circuit. When the relay K4 is de-energized a circuit path is provided by way of the closed contact of relay K3, the closed contact of relay K4, battery 34, resistor R3, and ammeter 56 to reversing switch 16, and from thence to the field windings of the motor.

As previously indicated, when the accelerator pedal is first depressed and switch S1 is closed, relays K2 and K3 are energized and the battery voltage which can be assumed to be 48 volts when banks 12 and 14 are in parallel, is coupled to field windings F1 and F2. The theory in accordance with the present invention is that less power is expended if a field can be established across the field windings and across winding F2 in particular. In this way the initial surge current to the armature 50 will be reduced thereby allowing the armature to develop its full torque at a lower power input. Thus, with relay K3 energized a field is established by means of battery 34 and an energizing current flows in winding F2 prior to any appreciable current flowing in winding F1 from the battery banks 12 and 14. Winding F1 does receive some current from the excitation circuit 18 by way of resistor R1. It is preferred that resistor R1 be selected so that approximately one-half the current which is fed to winding F2 from battery 34 couples to winding F1 to establish a field thereacross. For example, if field F2 has 50 amps flowing therein, field F1 will have 25 amps flowing therein.

Assuming that the batteries are still connected in parallel after a predetermined time period, the armature voltage $V_o$ increases to some predetermined value of approximately 50 to 60 volts. At that time relay coil C4 of relay K4 energizes and its associated contact K4a opens thereby introducing resistor R2, which was previously shorted out, into the excitation circuit. This decreases the current in the field winding F2 to say 30 amps thereby decreasing the armature e. m. f. The motor therefore speeds up to compensate for the decrease in e. m. f. therefore providing a higher speed of operation of the vehicle. This excitation circuit is believed to create the equivalent of a shunt field characteristic at various operating speeds.

In addition to the energization of relay K4, the armature voltage $V_o$ can also be monitored to cause the battery banks 12 and 14 to change from a parallel connection to a series connection thereby feeding a higher voltage to the motor and enabling the motor to operate at a higher speed as controlled by carbon pile 52. Switch S3 can be moved to one of three positions and when it is in the automatic position (movable contacts a and b coupled to fixed contacts e and f) the voltage $V_o$ across the armature 50 is coupled to coil C5 of relay K5. When this voltage increases to a sufficient value which preferably is about 10 volts lower than the value necessary to excite coil C4, coil C5 is excited and its associated contacts K5a and K5b close thereby connecting banks 12 and 14 in series rather than in parallel. When S3 is in its normal position, the movable contacts S3a and S3b are opened and are not contacting either contacts S3c, S3d, S3e or S3f. When the switch S3 is changed to its high speed position, the relay coil C5 is immediately energized from battery bank 14 and the batteries are changed to a series connection independent of the armature voltage $V_o$.

In accordance with another aspect of the present invention there may be provided an additional foot pedal switch 60 which may be arranged coupled to the brakes of an ordinary gasoline vehicle. This switch is coupled to a relay K6 having a coil C6 and associated contact K6a. When the foot pedal switch is depressed the contact K6a closes, thereby placing a resistor R4 across the armature 50 and field windings thereby dissipating generated power through resistor R4 creating dynamic braking and decreasing the speed of the vehicle.

In accordance with another aspect of this invention the excitation circuit can be modified for regenerative operation especially useful in hilly terrain. For this type of operation resistor R3 is preferably decreased to thereby increase current in winding F2. Diodes D4 are also removed, and relay K4 is preferably kept de-energized. Battery 34 may be a 12-volt battery also to provide more excitation current. When going down hill, a recharging (regeneration) occurs when the motor overspeeds by 10 to 15 percent. With the present invention a conventional series motor can be used and with the addition of an excitation circuit a shunt field effect can also be obtained. Also, the concepts herein disclosed are also applicable to other types of DC motors.

Having described one embodiment of the present invention it should become obvious that numerous other modifications can be made of the disclosed embodiment without departing from the scope of this invention. For example, different numbers of batteries can be used depending for one thing upon the weight of the vehicle. Also, the relays shown can be replaced by semiconductor devices such as silicon controlled rectifiers. In addition, at least part of relay K1 can be replaced by a solid-state logic circuit. Moreover, the carbon pile can be replaced by a solid state control circuit.

What is claimed is:

1. A circuit for powering a vehicle comprising:
   a direct-current motor including an armature and a pair of field windings which are coupled in parallel with each other and in series with the armature,
   at least one storage battery for powering the motor,
   means for selectively connecting the storage battery to the motor,
   means for permitting either forward or reverse operation of the motor,
   means for recharging the storage battery,
   and an excitation circuit coupled to said pair of field windings for establishing a current therein and including a power source,
   wherein said power source is coupled in parallel polarity with said storage battery.

2. A circuit for powering a vehicle comprising:
   a direct current motor including an armature and a pair of field windings which are coupled in parallel with each other and in series with the armature,
   at least one storage battery for powering the motor,
   means for selectively connecting the storage battery to the motor,
   means for permitting either forward or reverse operation of the motor,
   means for recharging the storage battery,
   an excitation circuit coupled to said pair of field windings for establishing a current therein and including a power source,
   and interlock means for inhibiting the connecting of the storage battery to the motor when the storage battery is being recharged.

3. A circuit for powering a vehicle comprising:
a direct current motor including an armature and a pair of field windings which are coupled in parallel with each other and in series with the armature,
a pair of storage of batteries powering the motor,
means for selectively connecting the storage battery to the motor,
means for permitting either forward or reverse operation of the motor,
means for recharging the storage battery,
an excitation circuit coupled to said pair of field windings for establishing a current therein and including a power source,
and means for monitoring the voltage across said armature for changing from a parallel to a series connection when a predetermined voltage is reached.

4. A circuit for powering a vehicle comprising:
a direct current motor including an armature and a pair of field windings which are coupled in parallel with each other and in series with the armature,
a pair of storage of batteries powering the motor,
means for selectively connecting the storage battery to the motor,
means for permitting either forward or reverse operation of the motor,
means for recharging the storage battery,
an excitation circuit coupled to said pair of field windings for establishing a current therein and including a power source,
and means responsive to motor speed for changing from a parallel to a series connection when a predetermined speed is reached.

5. A circuit for powering a vehicle comprising:
a direct current motor including an armature and a pair of field windings which are coupled in parallel with each other and in series with the armature,
at least one storage battery for powering the motor,
means for selectively connecting the storage battery to the motor,
means for permitting either forward or reverse operation of the motor,
means for recharging the storage battery,
an excitation circuit coupled to said pair of field windings for establishing a current therein and including a power source,
wherein said recharging means includes a multi-tap transformer and bridge circuit, wherein said transformer is adjustable to provide different charge rates.

6. The circuit of claim 2 wherein the interlock means includes a multi-contact relay.

7. The circuit of claim 1 wherein said means for selectively connecting includes a switch that is coupled to and responsive to actuation of the accelerator pedal of the vehicle.

8. The circuit of claim 1 comprising electric brake means including resistive means coupled to said armature for decreasing motor speed upon actuation thereof.

9. The circuit of claim 1 wherein said permitting means includes a multi-position switch for reversing the polarity of the voltage applied to the armature.

10. The circuit of claim 1 wherein said excitation circuit is adapted to assume a first condition upon initial operation of the motor and a second condition upon attainment of a predetermined motor speed.

11. A circuit for powering a vehicle comprising:
a direct current motor including an armature and a pair of field windings which are coupled in parallel with each other and in series with the armature,
at least one storage battery for powering the motor,
means for selectively connecting the storage battery to the motor,
means for permitting either forward or reverse operation of the motor,
means for recharging the storage battery,
an excitation circuit coupled to said pair of field windings for establishing a current therein and including a power source,
wherein said excitation circuit is adapted to assume a first condition upon initial operation of the motor and a second condition upon attainment of a predetermined motor speed,
and means responsive to armature voltage for causing the change of said excitation circuit from the first condition to second condition.

12. The circuit of claim 11 including resistive means that is switched in the excitation circuit during the second condition to enable higher motor speed.

13. The circuit of claim 11 including resistive means connected in series with one of said field windings.

14. A circuit for powering a vehicle comprising:
a direct current motor including an armature and a pair of field windings which are coupled in parallel with each other and in series with the armature,
at least one storage battery for powering the motor,
means for selectively connecting the storage battery to the motor,
means for permitting either forward or reverse operation of the motor,
means for recharging the storage battery,
and an excitation circuit coupled to said pair of field windings for establishing a current therein and including a power source,
wherein said permitting means includes a multi-position switch for reversing the polarity of the voltage applied to the armature,
wherein said multi-position switch has an emergency-off position.

15. The circuit of claim 1 including a resistive means coupled in series with one of said field windings for limiting the current flowing therein.

16. The circuit of claim 15 wherein the excitation circuit is coupled directly across the field winding in series with the resistive means.

* * * * *